United States Patent
Oulahal et al.

(10) Patent No.: US 10,009,822 B2
(45) Date of Patent: Jun. 26, 2018

(54) TECHNIQUE FOR ROUTING PACKETS

(71) Applicant: ORANGE, Paris (FR)

(72) Inventors: Nordine Oulahal, Grenoble (FR);
Xavier Roubaud, Montbonnot Saint Martin (FR)

(73) Assignee: Orange, Paris (FR)

( * ) Notice: Subject to any disclaimer, the term of this patent is extended or adjusted under 35 U.S.C. 154(b) by 0 days. days.

(21) Appl. No.: 14/784,929

(22) PCT Filed: May 22, 2014

(86) PCT No.: PCT/FR2014/051207
§ 371 (c)(1),
(2) Date: Oct. 15, 2015

(87) PCT Pub. No.: WO2014/188134
PCT Pub. Date: Nov. 27, 2014

(65) Prior Publication Data
US 2016/0081002 A1    Mar. 17, 2016

(30) Foreign Application Priority Data
May 23, 2013 (FR) ...................................... 13 54646

(51) Int. Cl.
*H04W 4/00* (2018.01)
*H04W 40/04* (2009.01)
(Continued)

(52) U.S. Cl.
CPC ............ *H04W 40/04* (2013.01); *H04B 7/155* (2013.01); *H04L 12/2801* (2013.01);
(Continued)

(58) Field of Classification Search
CPC .... H04W 40/04; H04L 12/66; H04L 12/2801; H04L 67/141; H04B 7/155
(Continued)

(56) References Cited

U.S. PATENT DOCUMENTS

2003/0031180 A1* 2/2003 Datta .................. H04L 12/5692
370/392
2008/0049781 A1 2/2008 Bugenhagen
(Continued)

FOREIGN PATENT DOCUMENTS

WO    2006119573    11/2006

OTHER PUBLICATIONS

The Written Opinion from the PCT/FR2014/051207.
The International Search Report from PCT/FR2014/051207.

*Primary Examiner* — Faisal Choudhury
(74) *Attorney, Agent, or Firm* — Haverstock & Owens LLP

(57) ABSTRACT

The invention relates to a technique for forwarding data packets by a gateway device (11). The gateway device ensures an interconnection between the client entities (20, 21) of a local network (4) and a communication network (1), that is to say forwards packets received from a client entity to the communication network by means of a nominal interface and vice versa. The gateway device identifies at least one device (10, 30), termed the relay device, accessible by means of a second interface and able to play a role of relay to forward packets exchanged between a client entity and the communication network. When a packet indicating that a session is initiated is received from a client entity, the gateway device forwards the packets of the session by means of the second interface, when a forwarding selection criterion is satisfied, or by means of the nominal interface in the converse case.

11 Claims, 2 Drawing Sheets

(51) Int. Cl.
*H04L 12/803* (2013.01)
*H04L 12/28* (2006.01)
*H04B 7/155* (2006.01)
*H04L 12/66* (2006.01)
*H04L 29/08* (2006.01)

(52) U.S. Cl.
CPC .......... *H04L 12/2898* (2013.01); *H04L 12/66* (2013.01); *H04L 47/125* (2013.01); *H04L 67/141* (2013.01)

(58) Field of Classification Search
USPC ......................................................... 370/328
See application file for complete search history.

(56) References Cited

U.S. PATENT DOCUMENTS

2010/0322141 A1* 12/2010 Liu ........................ H04W 24/10
370/315
2014/0293959 A1* 10/2014 Singh ................ H04W 36/0016
370/331

* cited by examiner

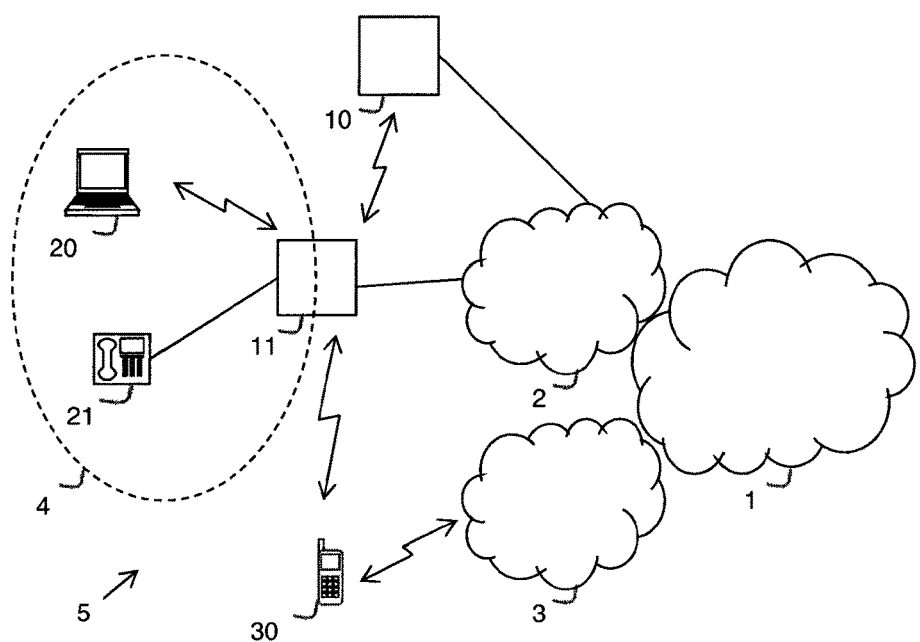
Fig. 1
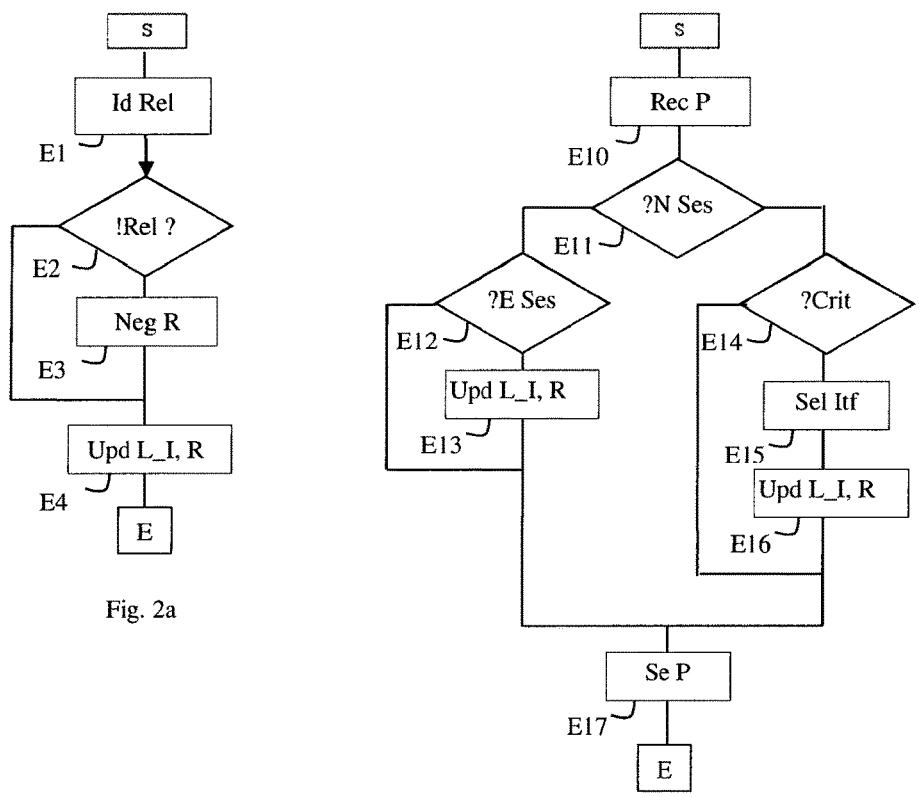
Fig. 2a
Fig. 2b

TECHNIQUE FOR ROUTING PACKETS

The invention lies in the field of the interconnection between a local area network and a communication network. More precisely, the invention concerns a technique for routing data packets through a gateway device, which is capable of providing this interconnection.

An entity in a local area network (LAN) accesses a wide area communication network (WAN, "wide area network"), such as the Internet network, through a gateway device. The principal role of the gateway device is to set up and manage a connection to the wide area communication network, and to convert a stream received from the wide area communication network into a protocol that can be used by the entities of the local area network and vice versa. By way of example, this gateway device corresponds to a residential gateway, to a routing device, etc. By way of non limiting example, the interface to the wide area communication network is of ADSL (asymmetric digital subscriber line), cable or optical fiber type, and the interface to the local area network is of WiFi "Wireless Fidelity", or else Ethernet type. This interface to the local area network allows the gateway device to communicate with the entities of the local area network. When one of the entities of the local area network downloads a content with a large volume, such as a video content, the other entities of the local area network suffer a decrease in performance.

One of the aims of the invention is to overcome inadequacies/drawbacks of the prior art and/or to make improvements thereto.

According to a first aspect, the subject of the invention is a method for routing data packets through a gateway device, the gateway device being capable of routing packets received from a client entity in a local area network to a communication network by means of a nominal interface and vice versa, the gateway device moreover comprising a second wireless interface. The method comprises the following steps implemented by the gateway device:
- identification of at least one device, called a relay device, that is accessible by means of the second interface and capable of playing a relay role in order to route packets exchanged between a client entity and the communication network;
- reception, from a client entity, of a data packet indicating that a session is initiated;
- when a routing selection criterion is verified, routing of the packets relating to said session by means of the second interface through the relay device;
- when said selection criterion is not verified, routing of the packets relating to said session by means of the nominal interface.

Thus, the routing method allows the gateway device to use additional resources that are provided by relay devices for connecting client entities in the local area network to the communication network. This makes it possible to provide a service of best quality for the client entities of the local area network.

By way of example, the client entities correspond to personal computers, to mobile terminals, etc.

By way of example, the relay devices correspond to another gateway device in a neighboring local area network (for example to a public WiFi "hot spot" of a trader, of a group, a community WiFi of a private individual, etc.), to a wireless WiFi access point of an operator, to a mobile terminal having access to a data service.

A nominal interface is the name used for the interface by means of which the gateway device interconnects the local area network and the communication network. By way of example, it is an interface of ADSL type, an interface of optical fiber type, etc. By way of example, the second interface corresponds to a wireless interface of WiFi type. It may have one or more relay devices that are accessible by means of the second interface. The gateway devices known from the prior art use this second interface to communicate with certain client entities of the local area network. In this data packet routing technique, the gateway devices use it to communicate with relay devices in order to route data packets to client entities of the local area network and from the communication network and vice versa.

The selection criterion makes it possible to choose one of the available interfaces for routing the packets, the nominal interface of else the second interface. The capacity available at the gateway device for routing packets is thus increased.

The gateway device may likewise have other interfaces, of the same type or else of different types.

It is emphasized here that the gateway device provides unique connectivity to the communication network from the point of view of the client entities. No modification is necessary at the client entities. The routing method is entirely transparent for the latter.

It is thus possible for the users of the local area network to provisionally have a higher bit rate than that can be routed by means of the nominal interface.

In one particular embodiment, the routing selection criterion likewise takes into account the availability or otherwise of the nominal interface. Thus, in the event of a one-off failure in the nominal interface, the service of connection to the communication network is provided for the users of the local area network.

The service provided for the users of the local area network thus has an improved quality of service.

The various embodiments or implementation features cited below can be added independently or in combination with one another to the steps of the routing method as defined above.

According to one particular feature of the method, the selection criterion belongs to the group comprising at least one temporal criterion, a load criterion, a criterion relating to a service with which the session is associated.

By way of example, the temporal criterion corresponds to times during which it is possible to route some of the packets by means of the second interface. By way of non limiting example, at certain times of the day, a relay device is not used as a relay because it is already busy at these times or likely to be.

When the nominal interface is unable to take care of a new session owing to an excessive load, the new session can be routed to a relay device by means of the second interface. It is thus possible to provide a service for the client entity even when the nominal interface is overloaded.

It is likewise possible to route the packets for some sessions according to the associated service. By way of example, file downloads can be carried out by means of the second interface in order to leave capacity for realtime applications routed by means of the nominal interface.

According to one particular feature of the method, a bit rate provided for the gateway device by the identified relay device is obtained.

Taking account of the bit rate provided by the relay device thus allows finer selection of the relay device to be used.

Advantageously, the method comprises negotiation relating to use of the relay device in order to route packets within the limits of the bit rate provided.

In an initial step, the gateway device negotiates with the relay device what is the bit rate provided. The relay device can thus fix a limit to its use by the gateway device.

Advantageously, the gateway device, storing a current bit rate routed through the relay device, routes the packets relating to said session by means of the nominal interface when a bit rate that is available for routing through the relay device does not allow the packets relating to the session to be routed.

For each relay device, the gateway device stores a current bit rate that is routed by means thereof and, to this end, likewise supervises session closures. This allows the gateway device to choose the interface that is best suited to routing the session.

According to a second aspect, the invention likewise concerns a gateway device, which is designed to route data packets received from a client entity in a local area network to a communication network by means of a nominal interface and vice versa, moreover comprising:

- at least one second wireless interface;
- an identification module for identifying at least one device, called a relay device, that is accessible by means of the second interface and capable of playing a relay role in order to route packets exchanged between a client entity and the communication network;
- a reception module, designed to receive from a client entity a data packet indicating that a session is initiated;
- a routing module for routing the packets relating to said session, which is designed to route the packets by means of the second interface through the relay device when a routing selection criterion is verified and to route the packets by means of the nominal interface when said selection criterion is not verified.

The advantages that are set out for the method according to the first aspect can be transposed directly to the gateway device.

According to a third aspect, the invention moreover concerns a routing system for routing data packets between client entities in a local area network and a communication network, said system comprising a gateway device according to the second aspect and at least one device, designed to play a relay device role in the routing of the packets between the client entities and the communication network. The second device is accessible by means of the second interface.

According to a fourth aspect, the invention concerns a program for a gateway device, comprising program code instructions that are intended to control the execution of the steps of the routing method described above when this program is executed by this gateway device and a recording medium that can be read by a gateway device on which a program for a gateway device is recorded.

The advantages that are set out of the routing method according to the first aspect can be transposed directly to the program for a gateway device and to the recording medium.

The invention will be better understood upon reading the following description of particular embodiments of the routing technique, with reference to the appended drawings, in which:

FIG. 1 shows a gateway device in its environment;

FIGS. 2a-2b illustrate steps implemented by the gateway device according to a particular embodiment of the routing method;

Figure 3:
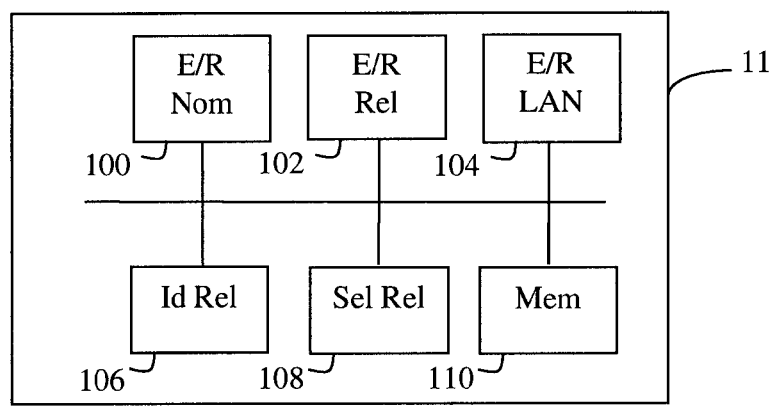
FIG. 3 shows a gateway device according to a particular mode of the invention.

FIG. 1 shows a gateway device 11 in its environment. The gateway device 11 constitutes a single entry point toward pieces of equipment in a local area network 4 LAN. These pieces of equipment are subsequently called client entities. By way of example, the gateway device 11 is situated at the home of a user when it is in a private local area network. By way of example, the client entities correspond to a personal computer 20, a telephone 21. The client entities may likewise correspond to cellphones, smart cellphones (or "smartphone"), etc. There is no limitation attached to the client entities or to the number thereof. The gateway device 11 plays a role to interconnect the local area network 4 and a wide area communication network 1 WAN ("wide area network") through an access network 2. By way of example, the communication network 1 corresponds to the Internet network. More precisely, the gateway device 11 is designed to route data packets received from a client entity 20, 21 to the communication network 1 by means of a nominal interface and to receive data packets through the nominal interface bound for the client entity 20, 21. By way of illustrative example, the nominal interface of the gateway device 11 corresponds to an access of ADSL ("asymmetric digital subscriber line") type. It may likewise be accessed by means of an optical fiber, a cable, etc. There is no limitation attached to the type of access by means of this nominal interface. The gateway device 11 can constitute an access point that is shared between a plurality of client entities belonging to a company or to a group of users, for example.

FIG. 1 likewise shows another gateway device 10. This other gateway device allows client entities in another local area network (which are not shown in FIG. 1) to access the communication network 1 through the access network 2. This gateway device 10 comprises an interface of WiFi ("wireless fidelity") type that allows it to communicate with the client entities of its local area network. The gateway device 10 likewise provides users other than those of its local area network with some of its capacity that is available on its WiFi interface. This provision is known by the name of service of community WiFi type. The gateway device 10 then plays a role of relay device toward the communication network 1. A single gateway device providing this service is shown so as not to overload FIG. 1. The gateway device 10 can likewise correspond to a WiFi access point or WiFi "hot spot". There is moreover no limitation attached to the number of gateway devices playing the role of relay devices.

A mobile terminal 30 is likewise shown in FIG. 1 and allows its user to access the communication network 1 by means of a wireless interface through a mobile network 3. By way of example, the mobile network 3 is a network referred to as third generation 3G in accordance with the specifications defined by the standardization body 3GPP ("Third Generation Partnership Project"). In the embodiment described, the mobile terminal 30 likewise has an interface of WiFi type. The mobile terminal 30 likewise provides other users with some of its capacity that is available on its radio interface to the mobile network 3 by playing a WiFi access point role toward the communication network 1. The mobile terminal 30 is thus a relay device toward the communication network. More precisely, the mobile terminal 30 is configured as a 3G modulator/demodulator, called a 3G modem. A single mobile terminal playing the role of relay device is shown in FIG. 1. There is no limitation attached to the number of mobile terminals playing this role. It is emphasized here that the mobile terminal 30 may or may not belong to a user of a client entity of the local area network 4.

The gateway device 11 likewise has a second interface, for example of WiFi type. This second interface is used to communicate with some of the client entities of the local area network 4. In one particular embodiment, the gateway device 11 uses this second interface to communicate with relay devices, such as the gateway device 10, the mobile terminal 30, notably in order to route packets from the client entities of the local area network 4 to the communication network 1 and to receive packets from the communication network 1 bound for the client entities of the local area network 4. More precisely, the packets from some sessions between the client entities of the local area network 4 and the communication network 1 transit through a relay device.

We will now describe the routing method, as implemented by the gateway device 11 in one particular embodiment, with reference to FIGS. 2a and 2b.

FIG. 2a shows steps implemented by the gateway device 11 in order to draw up a list of relay devices, that is to say a list containing at least one device that is capable of playing a relay role in order to route packets exchanged between a client entity of the local area network 4 and the communication network 1.

In a step E1, the gateway device 11 determines whether pieces of equipment are accessible by means of its second interface, that is to say are situated in its radio coverage area. Then, still in step E1, the gateway device 11 determines whether these accessible pieces of equipment are capable of playing a relay role toward the communication network 1. For the gateway device 10, this involves provision of a community service. By means of this service provision, the gateway device 10 indicates that it provides some of its capacity toward the communication network 1. For the mobile terminal 30, this involves provision of a service as a third generation 3G or fourth generation 4G/LTE ("Long Term Evolution") modem. The mobile terminal 30 is configured to be accessible to a set of devices, including the gateway device 11.

In a step E2, the gateway device 11 checks whether at least one relay device 10, 30 has been determined. If this is the case, in a step E3, the gateway device 11 obtains a bit rate R provided by the relay device.

In one particular embodiment, in order to obtain the bit rate R that is provided, the gateway device 11 negotiates with the relay device use thereof to route packets within the limits of the bit rate R provided. By way of non limiting example, the gateway device 11 transmits a request for use of a bit rate D to the relay device and the latter responds by transmitting a negotiated bit rate R and, if need be, conditions of use of the bit rate provided. By way of example, the conditions of use correspond to intervals of time for provision, compensation conditions, a maximum data threshold, etc.

This step E3 is reiterated, if need be, for all of the relay devices identified in step E1.

In a step E4, the gateway device 11 updates a list of available relay devices. In one particular embodiment, the gateway device 11 associates the provided bit rate R likewise with each identified relay device. A device that had been identified as a relay device during previous execution of steps E1 to E4 and that is no longer in the coverage area of the gateway device 11 is deleted from the list of relay devices in the course of this step E4.

This set of steps E1 to E4 can be executed in a regular manner, or else execution thereof can be commanded when a relay device on the list cannot be reached. A relay device becomes unreachable for example when a breakdown occurs on this device or else when said device is no longer in the coverage area of the gateway device 11. There is no limitation attached to the conditions for triggering execution of these steps E1 to E4, aiming at drawing up a list containing at least one device that is capable of playing a relay role in order to route packets exchanged between a client entity of the local area network and the communication network.

FIG. 2b shows steps implemented by the gateway device 11 in order to route a data packet exchanged between a client entity 20, 21 of the local area network 4 and the communication network 1, more precisely from the client entity to the communication network 1.

In a step E10, the gateway device 11 receives from the client entity 20, 21 a data packet P to be routed to the communication network 1.

In a step E11, the gateway device 11 determines whether the packet P indicates that a session is initiated. More precisely, the packet P carries a piece of information relating to setup of a new session.

If this is the case, in a step E14, the gateway device 11 checks that a routing selection criterion is verified.

By way of example, a routing selection criterion corresponds to a temporal criterion, a load criterion, a criterion relating to a service with which the session is associated. The routing selection criterion can likewise correspond to a combination of these different criteria. It is not an exhaustive list of routing selection criteria.

By way of example, the temporal criterion corresponds to times during which it is possible to route some of the packets through a relay device 10, 30 by means of the second interface. By way of non limiting example, at some times of the day, the mobile terminal 30 is not used because its routing capacity is generally limited at these times. This use condition may have been obtained during the negotiation in step E3.

By way of example, the load criterion corresponds to a routing rule according to the load on the nominal interface of the gateway device 11. When this interface has a load level above a threshold, the new session can be routed to a relay device 10, 30 by means of the second interface. It is thus possible to provide a service for the client entity even when the nominal interface is overloaded. Still by way of example, the load criterion can correspond to a rule for sharing load between the interfaces that are available at the gateway device 11. This allows the load to be balanced between the different interfaces.

The criterion relating to a service with which the session is associated makes it possible to define services for which the routing will be carried out in a preferential manner by means of the second interface. A file download service can be executed by means of the second interface, for example, so as not to load the nominal interface and thus to leave capacity of the nominal interface for realtime applications.

If, in step E14, the routing selection criterion is verified, in a step E15, the gateway device 11 selects a relay device 10, 30 that is accessible by means of its second interface (or one of its second interfaces) by means of which the packets relating to this new session will be routed. The second interface then corresponds to the selected interface. The packets are then routed through the relay device 10, 30.

In a step E16, if need be, the gateway device 11 updates the list of available relay devices by storing therein the routing of the new session through the relay device.

If, in step E14, the routing selection criterion is not verified, the selected interface remains the default interface, that is to say the nominal interface.

In both cases, in a step E17, the gateway device 11 routes the packets relating to this session by means of the selected interface, including the packet P being processed. When the selection criterion is not verified, the packets are routed by means of the nominal interface. When the second interface has been selected, the routing is carried out through a relay device.

The gateway device 11 then returns to awaiting reception of a new packet to be routed.

When, in step E11, the gateway device 11 has determined that the packet P is not the first packet relating to the session, in a step E12, the gateway device 11 checks whether the packet P indicates that the session is being closed.

If this is the case, in a step E13, the gateway device 11 updates the list of available relay devices by deleting therefrom the information relating to routing of the session through the relay device.

In both cases, that is to say whether or not the packet indicates that the session is being closed, the gateway device 11 implements step E17 of routing the packet P, which step is described above. The gateway device 11 then returns to awaiting reception of a new packet to be routed.

It is thus noted that once a routing interface has been selected, all of the packets relating to the session are routed to the communication network 1 by the same route. The implementation of the routing method is moreover completely transparent to the client entities. No modification is necessary for the devices of the local area network 4. It is thus possible for the users of the local area network 4 to provisionally have a higher bit rate than that routed by means of the nominal interface.

In one particular embodiment, the routing selection criterion likewise takes into account the availability or otherwise of the nominal interface. Thus, in the event of a one-off failure in the nominal interface, the service of connection to the communication network 1 is provided for the users of the local area network 4.

It is likewise noted that when one of the relay devices disappears from the list of available relay devices, another relay device can be used. The service provided for the users of the local area network 4 has an improved quality of service.

In one particular embodiment, in steps E13 and E16 of updating the list of available relay devices, the gateway device 11 stores a current bit rate routed through the relay device. In this case, in step E14, the gateway device 11 likewise takes into account this current bit rate in order to verify the routing selection criterion. Thus, when the selection criterion is verified, the packets relating to the new session are routed by means of the nominal interface when the remaining bit rate available for routing through the relay device, that is to say the bit rate provided decreased by the current bit rate, is insufficient for routing the new session.

Other embodiments can likewise be envisaged while remaining within the scope of the routing method described above.

It is emphasized at this juncture that the packets relating to a session that are transmitted from the communication network 1 to the client entity take the same path through the relay device. The routing method implemented by the gateway device 11 in order to route an exchanged packet from the communication network 1 to a client entity is not described more precisely, the gateway device 11 implementing a function for routing the packets to the client entity that is known in the prior art.

The operation of the routing method is illustrated by means of an example. The gateway device 11 is connected to the communication network 1 by an ADSL link of bit rate F. A user of the local area network 4 has a mobile terminal 30 having two interfaces, one of WiFi type and the other of 3G type. A bit rate M1 can be routed on the interface of 3G type to the communication network 1 and vice versa. Another user of the local area network has another mobile terminal (not shown in FIG. 1) likewise having two interfaces, one of WiFi type and the other of 3G type. A bit rate M2 can be routed on the interface of 3G type to the communication network 1 and vice versa. The second gateway device 10 provides a bit rate C for the community WiFi service for connection to the communication network 1. Using the interface of WiFi type, the gateway device 11 can thus route data packets to the second gateway device 10 and the two mobile terminals. These three devices play the role of relay devices in the connection of the gateway device 11 to the communication network 1. It is assumed that the sum of the bit rates M1, M2 and C does not exceed the bit rate available on the interface of WiFi type. By virtue of the routing method, the gateway device 11 can provide the client entities of the local area network 4 with a bit rate close to the sum of the bit rates F, M1, M2 and C.

We will now describe a gateway device in one particular embodiment of the invention with reference to FIG. 3. Such a gateway device 11, which is designed to provide interconnection between a local area network 4 and a communication network 1, notably comprises:

a first transmission/reception module 100 for transmission/reception by means of a nominal interface;

a second transmission/reception module 102 for transmission/reception by means of a second interface;

a third transmission/reception module 104, which is designed to communicate with the client entities in the local area network 4;

an identification module 106 for identifying at least one device, called a relay device, that is accessible by means of the second interface and capable of playing a relay role in order to route packets exchanged between a client entity and the communication network;

a routing module 108, designed to route packets relating to a session, when a routing selection criterion is verified, by means of the second interface through the relay device and when the selection criterion is not verified, by means of the nominal interface;

a memory area 110, designed notably to store a list of available relay devices.

The identification module 106 is notably designed to store in the memory area 110 the list of relay devices comprising at least one identified relay device. In one particular embodiment, the identification module 106 is likewise designed to obtain a bit rate R provided by the relay device and to store in the list of relay devices the bit rate R provided for the identified relay device. In a variant, the identification module 106 is designed to negotiate with the relay device use thereof for routing packets within the limits of the bit rate R provided.

The identification module 106 is likewise designed to update the list of available relay devices, notably by deleting a device that is no longer capable of playing a relay role.

The third transmission/reception module 104 is notably designed to receive from a client entity a packet indicating that a session is initiated. The routing module 108 is designed to verify the selection criterion for the new session and, if need be, to select the second interface for routing the packets relating to the initiated session through a relay device. The routing module 108 is designed to update the list of relay devices in the memory area 110 by storing therein the routing of the new session through the relay device.

The first 100, second 102 and third 103 transmission/reception modules are notably designed to determine whether a packet P indicates that a session is being closed.

The routing module 108 is then designed to update the list of available relay devices in the memory area 110 by deleting therefrom the information relating to routing of the session through the relay device.

In one particular embodiment, the routing module 108 is designed to store a current bit rate routed through a relay device in the list of relay devices and to take into account this current bit rate in order to verify the routing selection criterion.

The invention is implemented by means of software and/or hardware components. With this in mind, the term "module" can correspond in this document either to a software component or to a hardware component or to a set of hardware and/or software components, which is capable of implementing a function or set of functions, according to what is described above for the module in question.

A software component corresponds to one or more computer programs, one or more sub routines of a program or, more generally, to any element of a program or of a piece of software. Such a software component is stored in memory and then loaded and executed by a data processor of a physical entity and is able to access the hardware resources of this physical entity (memories, recording media, communication bus, electronic input/output boards, user interfaces, etc.).

In the same way, a hardware component corresponds to any element of a hardware assembly. It may be a hardware component that is programmable or otherwise, with or without an integrated processor for executing software. By way of example, it is an integrated circuit, a chip card, an electronic board for executing a piece of firmware, etc.

In one particular embodiment, the modules 100, 102, 104, 106, 108 are designed to implement the routing method described above. These are preferably software modules comprising software instructions for executing the steps of the routing method described above, which are implemented by a gateway device. The invention therefore also concerns:
- a program for a gateway device, comprising program code instructions that are intended to control the execution of the steps of the routing method described above when said program is executed by said gateway device;
- a recording medium that can be read by a gateway device on which is recorded the program for a gateway device.

The software modules can be stored in or transmitted by a data storage medium. The latter may be a hardware storage medium, for example a CD-ROM, a magnetic floppy disk or a hard disk, or else a transmission medium such as an electrical, optical or radio signal, or a telecommunication network.

The invention likewise concerns a routing system 5 for routing data packets comprising a gateway device 11 as described above and at least one device 10, 30, which is designed to play a relay device role in the routing of the packets between client entities 20, 21 of the local area network 4 and the communication network 1.

The invention claimed is:

1. A method for routing data packets through a gateway device, the gateway device being capable of routing packets received from a client entity in a local area network to a communication network by means of a nominal interface and vice versa, the gateway device moreover comprising a second wireless interface, said method comprising the following steps implemented by the gateway device:
   identification of at least one device, called a relay device, that is accessible by means of the second interface and capable of playing a relay role in order to route packets exchanged between a client entity and the communication network;
   reception, from a client entity, of a data packet;
   determination whether the packet indicates that a session is initiated;
   when the packet indicates that a session is initiated and when a routing selection criterion is verified, selection of the second interface for routing of the packets relating to said session by means of the second interface through the relay device;
   when the packet indicates that a session is initiated and when said selection criterion is not verified, selection of the nominal interface for routing of the packets relating to the session by means of the nominal interface;
   when the packet does not indicate that a session is initiated, routing of the packet by means of a selected interface for that session; and
   obtainment of a bit rate provided for the gateway device by the identified relay device, wherein the gateway device, storing a current bit rate routed through the relay device, routes the packets relating to said session by means of the nominal interface when a bit rate that is available for routing through the relay device does not allow the packets relating to the session to be routed.

2. The routing method as claimed in claim 1, in which the selection criterion belongs to the group comprising at least one temporal criterion, a load criterion, a criterion relating to a service with which the session is associated.

3. The routing method as claimed in claim 1, comprising negotiation relating to use of the relay device in order to route packets within the limits of the bit rate provided.

4. A gateway device, which is designed to route data packets received from a client entity in a local area network to a communication network by means of a nominal interface and vice versa, the gateway device comprising:
   at least one second wireless interface; and
   a non-transitory computer-readable memory comprising:
      an identification module for identifying at least one device, called a relay device, that is accessible by means of the second interface and capable of playing a relay role in order to route packets exchanged between a client entity and the communication network;
      a reception module, designed to receive from a client entity a data packet and determine whether the data packet indicates that a session is initiated; and
      a routing module for routing the packets relating to said session, which is designed to:
         when the packet indicates that a session is initiated and when a routing selection criterion is verified, select the second interface and route the packets relating to said session by means of the second interface through the relay device;
         when the packet indicates that a session is initiated and when said selection criterion is not verified, select the nominal interface and route the packets relating to the session by means of the nominal interface;
         when the packet does not indicate that a session is initiated, route the packet by means of a selected interface for that session; and
      wherein a bit rate provided for the gateway device by the identified relay device is obtained, and further wherein the gateway device, storing a current bit rate routed through the relay device, routes the packets relating to said session by means of the nominal interface when a bit rate that is available for routing through the relay device does not allow the packets relating to the session to be routed.

5. A routing system for routing data packets between client entities in a local area network and a communication network, said routing system comprising a gateway device which is designed to route data packets received from a client entity in a local area network to a communication network by means of a nominal interface and vice versa, the gateway device comprising:
   at least one second wireless interface;
   a non-transitory computer-readable memory comprising:
      an identification module for identifying at least one device, called a relay device, that is accessible by means of the second interface and capable of playing a relay role in order to route packets exchanged between a client entity and the communication network;
      a reception module, designed to receive from a client entity a data packet and determine whether the data packet indicates that a session is initiated; and
      a routing module for routing the packets relating to said session, which is designed to:
         when the packet indicates that a session is initiated and when a routing selection criterion is verified, select the second interface and route the packets relating to said session by means of the second interface through the relay device;
         when the packet indicates that a session is initiated and when said selection criterion is not verified, select the nominal interface and route the packets relating to the session by means of the nominal interface;
         when the packet does not indicate that a session is initiated, route the packet by means of a selected interface for that session; and
      wherein a bit rate provided for the gateway device by the identified relay device is obtained, and further wherein the gateway device, storing a current bit rate routed through the relay device, routes the packets relating to said session by means of the nominal interface when a bit rate that is available for routing through the relay device does not allow the packets relating to the session to be routed; and
   at least one device, designed to play a relay device role in the routing of the packets between the client entities and the communication network.

6. A program for a gateway device, comprising program code instructions that are intended to control execution of steps of a method when said program is stored on a non-transitory computer-readable medium and executed by said gateway device, the method for routing data packets through a gateway device, the gateway device being capable of routing packets received from a client entity in a local area network to a communication network by means of a nominal interface and vice versa, the gateway device moreover comprising a second wireless interface, said method comprising the following steps implemented by the gateway device:
   identification of at least one device, called a relay device, that is accessible by means of the second interface and capable of playing a relay role in order to route packets exchanged between a client entity and the communication network;
   reception, from a client entity, of a data packet;
   determination whether the packet indicates that a session is initiated;
   when the packet indicates that a session is initiated and when a routing selection criterion is verified, selection of the second interface for routing of the packets relating to said session by means of the second interface through the relay device;
   when the packet indicates that a session is initiated and when said selection criterion is not verified, selection of the nominal interface for routing of the packets relating to the session by means of the nominal interface;
   when the packet does not indicate that a session is initiated, routing of the packet by means of a selected interface for that session; and
   obtainment of a bit rate provided for the gateway device by the identified relay device, wherein the gateway device, storing a current bit rate routed through the relay device, routes the packets relating to said session by means of the nominal interface when a bit rate that is available for routing through the relay device does not allow the packets relating to the session to be routed.

7. The program for a gateway device as claimed in claim 6, in which the selection criterion belongs to the group comprising at least one temporal criterion, a load criterion, a criterion relating to a service with which the session is associated.

8. The program for a gateway device as claimed in claim 6, comprising negotiation relating to use of the relay device in order to route packets within the limits of the bit rate provided.

9. A non-transitory recording medium that can be read by a gateway device on which a program is recorded, the program comprising program code instructions that are intended to control execution of steps of a method when said program is executed by said gateway device, the method for routing data packets through a gateway device, the gateway device being capable of routing packets received from a client entity in a local area network to a communication network by means of a nominal interface and vice versa, the gateway device moreover comprising a second wireless interface, said method comprising the following steps implemented by the gateway device:
   identification of at least one device, called a relay device, that is accessible by means of the second interface and capable of playing a relay role in order to route packets exchanged between a client entity and the communication network;
   reception, from a client entity, of a data packet:
   determination whether the packet indicates that a session is initiated;
   when the packet indicates that a session is initiated and when a routing selection criterion is verified, selection of the second interface for routing of the packets relating to said session by means of the second interface through the relay device;
   when the packet indicates that a session is initiated and when said selection criterion is not verified, selection of the nominal interface for routing of the packets relating to the session by means of the nominal interface;
   when the packet does not indicate that a session is initiated, routing of the packet by means of a selected interface for that session; and
   obtainment of a bit rate provided for the gateway device by the identified relay device, wherein the gateway device, storing a current bit rate routed through the relay device, routes the packets relating to said session by means of the nominal interface when a bit rate that is available for routing through the relay device does not allow the packets relating to the session to be routed.

10. The non-transitory recording medium as claimed in claim 9, in which the selection criterion belongs to the group comprising at least one temporal criterion, a load criterion, a criterion relating to a service with which the session is associated.

11. The non-transitory recording medium as claimed in claim 9, comprising negotiation relating to use of the relay device in order to route packets within the limits of the bit rate provided.

\* \* \* \* \*